United States Patent
Schendel

(10) Patent No.: US 8,305,203 B2
(45) Date of Patent: Nov. 6, 2012

(54) DEVICE FOR SETTING THE WHEEL SIZE OF A BICYCLE ON A BICYCLE COMPUTER

(75) Inventor: Klaus Schendel, Neustadt/Weinstrasse (DE)

(73) Assignee: Sigma Elektro GmbH, Neustadt/Weinstrasse (DE)

( * ) Notice: Subject to any disclaimer, the term of this patent is extended or adjusted under 35 U.S.C. 154(b) by 683 days.

(21) Appl. No.: 11/886,422

(22) PCT Filed: Jul. 13, 2006

(86) PCT No.: PCT/DE2006/001210
§ 371 (c)(1),
(2), (4) Date: Feb. 19, 2008

(87) PCT Pub. No.: WO2007/022739
PCT Pub. Date: Mar. 1, 2007

(65) Prior Publication Data
US 2008/0191852 A1  Aug. 14, 2008

(30) Foreign Application Priority Data
Aug. 19, 2005  (DE) .......................... 10 2005 039 615

(51) Int. Cl.
*B62J 3/00* (2006.01)
(52) U.S. Cl. ..................................... 340/432; 340/425.5
(58) Field of Classification Search ............... 340/425.5, 340/432
See application file for complete search history.

(56) References Cited

U.S. PATENT DOCUMENTS

| | | | | |
|---|---|---|---|---|
| 4,780,864 A | * | 10/1988 | Houlihan | 368/10 |
| 5,008,647 A | * | 4/1991 | Brunt et al. | 340/432 |
| 5,177,432 A | * | 1/1993 | Waterhouse et al. | 324/166 |
| 5,497,143 A | * | 3/1996 | Matsuo et al. | 340/432 |
| 5,585,780 A | * | 12/1996 | Sakashita | 340/432 |
| 5,629,668 A | * | 5/1997 | Downs | 340/432 |
| 5,737,247 A | * | 4/1998 | Baer et al. | 702/149 |
| 5,847,641 A | * | 12/1998 | Jinbo | 340/432 |
| 5,886,623 A | * | 3/1999 | Jinbo et al. | 340/432 |
| 6,484,836 B2 | * | 11/2002 | Tsuji | 180/90 |
| 6,781,510 B2 | * | 8/2004 | Takeda | 340/432 |

FOREIGN PATENT DOCUMENTS

| | | |
|---|---|---|
| DE | 34 46 689 A1 | 7/1986 |
| DE | 197 48 167 C1 | 12/1998 |
| EP | 0 887 251 A1 | 12/1998 |
| EP | 1 257 786 B1 | 8/2004 |

* cited by examiner

*Primary Examiner* — Brian Zimmerman
*Assistant Examiner* — James Yang
(74) *Attorney, Agent, or Firm* — Birch, Stewart, Kolasch & Birch, LLP

(57) ABSTRACT

The present invention relates to an apparatus for setting the wheel size of a bicycle (1, 2) on a bicycle computer (3) using input means (4, 5) on the bicycle computer (3). The aim is to be able to set the bicycle computer to the correct wheel size in a simpler and more reliable, virtually automatic, manner. This is achieved in that the bicycle computer (3) has at least two input means (4, 5) for at least two wheel sizes, in that a transmission means (6, 7), which can be assigned to the bicycle (1, 2), is provided for transmitting the wheel size of the bicycle (1, 2), and in that the transmission means (6, 7) interacts exclusively with that input means (4, 5) of the bicycle computer (3) which corresponds to the wheel size of the bicycle (1, 2).

13 Claims, 1 Drawing Sheet

DEVICE FOR SETTING THE WHEEL SIZE OF A BICYCLE ON A BICYCLE COMPUTER

Figure 1:
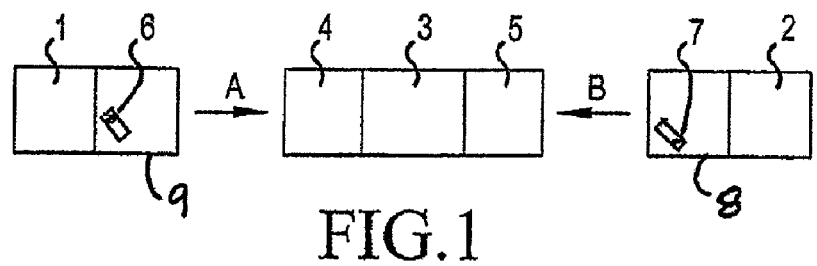

The present invention relates to a device for setting the wheel size of a bicycle on a bicycle computer using an input medium on the bicycle computer.

It is typical that bicyclists have more than one bicycle. At least two different bicycle types are used—on one hand for riding on roads, on the other hand for riding off-road. Bicycle computers, which are usually situated on the handlebars of the bicycle, are known from practice. Performance data is recorded, calculated, and displayed. The information of the athlete about his performance, in particular the distance covered, and the velocity, is currently considered standard—even for recreational athletes.

A receptacle component for the bicycle computer is typically located on the handlebars of the bicycle, which is typically removably attached there. A bicycle computer set to the correct wheel size may receive the pulses of the pulse generator situated on the wheel spokes and calculate and display the desired data.

If the bicyclist wishes to change the bicycle, it is important for him to install his bicycle computer on the current bicycle. Because the bicycles have different wheel sizes, the bicyclist has to set his bicycle computer to the current wheel size. Two fundamental methods are known from practice for performing the setting. On one hand, an input medium in the form of a changeover button may be manually actuated, which causes a setting inside the data processing system of the bicycle computer to the wheel size stored therein. On the other hand, programming may be performed via the menu buttons of the bicycle computer. Programming bicycle computers is difficult because of the small overall size and is often only possible using a pointed object for pressing a contact pin countersunk inside the housing. The usually extensive operating instructions detain the bicyclist. Upon actuation of the above-mentioned changeover button, there is no possibility to check whether the pressure was sufficiently strong or whether it was pressed twice unintentionally. Effort and time consumption as well as the frequency of error are high for the typical setting means. For the bicyclist concerned with performance, it is annoying if corrupted data results in an incorrect performance profile.

Proceeding from the prior art known from practice, the present invention is based on the object of specifying a device of the type under discussion, the bicycle computer being settable easily and reliably, nearly automatically, to the correct wheel size.

The above object is achieved by the features of claim 1. According to this claim, a device of the type under discussion is implemented and refined in such a way that the bicycle computer has at least two input media for at least two wheel sizes, a transmission medium assignable to the bicycle is provided for transmitting the wheel size of the bicycle, and the transmission medium works together exclusively with the input medium of the bicycle computer which corresponds to the wheel size of the bicycle.

According to the present invention, it has been recognized that the setting to the correct wheel size of the currently selected bicycle may be simplified if the bicycle computer has multiple input media for various wheel sizes corresponding to the number of the bicycles. Thus, an input medium is available for each special wheel size of the particular bicycle, which may work together with the transmission medium specific to the bicycle and/or wheel size. By tailoring the input medium specific to the wheel size and the transmission medium specific to the wheel size to one another, the bicyclist no longer has to make a selection himself, because of which the source of error is removed on one hand and the complex usage of the menu of the bicycle computer is avoided on the other hand. Secure and simple setting of the bicycle computer is provided according to the present invention.

According to a simple and robust embodiment, the input media may be implemented in the form of electrically conductive contacts, one of which works together in each case with the corresponding transmission medium, which is also provided as an electrically conductive contact. The input media may be spaced apart from one another, so that a spatial separation supports the specification precisely in regard to mechanical contact.

The transmission medium may be a component of a receptacle component for the bicycle computer which is known per se. For the embodiment of the device according to the present invention relating to electrically conductive contacts, metallic surfaces and/or plug contacts come into consideration. In regard to comfortable handling and a low danger of injury, contacts which project little are preferred. According to a constructively advantageous embodiment, the transmission medium may be provided in the form of a flat contact, while the input medium may be implemented as a spring-loaded contact pin. The spring-loaded contact pin may be rounded on the free end and only project slightly from the housing wall of the bicycle computer.

The wheel-specific input medium and the transmission medium come into a congruent position when the bicycle computer is positioned on the receptacle component, so that the wheel size is settable in the bicycle computer in accordance with the preset by the transmission medium via an electrical connection. On one hand, the transmission medium may be assigned the function that it initializes the input medium, which has already been established in regard to wheel size, or that it triggers the setting only by the actuation of the input medium. In this variant, the wheel sizes coming into consideration are already stored in the bicycle computer. On the other hand, there is also the possibility that a data transmission occurs originating from electronics contained in the recording part. Unknown bicycles are also usable through the latter possibility, whose wheel size is not stored in the bicycle computer.

In a simple construction variant for achieving congruency and/or for producing the electrical contact between input medium and transmission medium, the input medium of the bicycle computer is situated on its bottom side and the transmission medium of the receptacle component is situated on its top side. In the mounted state, the bottom side of the bicycle computer faces toward the top side of the receptacle component and the contacts are electrically connected.

In comparison to the configuration of a transmission medium of a first receptacle component of a first bicycle with the configuration of the transmission medium of a second receptacle component of a second bicycle, a distance is advantageously provided in way essential to the present invention, which corresponds to the distance between two input media on the bicycle computer. The basic idea of providing multiple input media which work together with one transmission medium is implemented mechanically in that transmission media of various bicycles are positioned in a way that they may exclusively work together with a single input medium of the bicycle computer. Confusion is precluded, because the setting of the input medium specific to the wheel size in relation to the transmission medium is already fixed when the bicycle computer is situated on the receptacle component.

Alternatively, contactless technology may also be used via signal transmission between the data transmission medium provided as a transmitter and a corresponding receiver of the bicycle computer. The various input media of the bicycle computer may be provided as various receiver frequencies, which react to the particular wheel size signal of the particular transmission medium of the particular bicycle. The constructive possibilities of assignment to one receptacle component on the bicycle and the bicycle computer may also advantageously be used in the transmitter-receiver frequency variant. Because various receiver frequencies are rather complex to implement, the input media may also be designed in such a way that a single receiving frequency is provided, which is capable, however, of recognizing various codes, so that the correct wheel size is set in this way.

In order that the bicycle computer may correspond in a suitable position to the receptacle component, the receptacle component may have a recess for accommodating the bicycle computer. A removable connection may be formed between the recess of the receptacle component and an engagement part of the bicycle computer projecting from the bottom side. For example, the engagement part may have an external thread and the recess may have an internal thread, but bayonet catches are also possible. In the present embodiment, the input media may be situated outside the area of the projecting engagement part of the bicycle computer, on the bottom side, while the transmission medium may be situated on an edge area surrounding the recess of the receptacle component.

In regard to the desired correspondence of the bicycle computer with all data specific to the bicycles and related to individuals or also relating to the environment, such as the heart rate or height specifications, the receptacle component may also comprise a data processing apparatus, which also contains the criterion of the wheel size in its memory. A separate power source for the receptacle component would then also be conceivable.

In a very simple variant of the device according to the present invention, the input of the wheel size occurs via the transmission medium on one hand, but also simultaneously the pulse frequency converted into an electrical signal reaches the input medium and thus the data processing system of the bicycle computer from the magnetic pulse generator on the bicycle via a reed switch. The required power comes via a power delivery contact of the bicycle computer to a power receiving contact of the receptacle component.

Further contacts between bicycle computer and receptacle component may also relate to the stroke frequency. The device according to the present invention for setting the wheel size may accordingly be expanded by several functions.

There are various possibilities for implementing and refining the teaching of the present invention advantageously. Reference is made on one hand to the patent claims and on the other hand to the following explanation of an exemplary embodiment of the present invention on the basis of the drawing. Preferred embodiments and refinements of the teaching are explained in general in connection with the explanation of the cited exemplary embodiment of the present invention on the basis of the drawing. In the drawing FIG. 1 shows a schematic illustration in principle of a general representation of the device according to the present invention and FIG. 2(a), 2(b), and 2(c) shows a schematic illustrations of an exemplary embodiment of the device according to the present invention.

FIG. 1 shows a schematic illustration in principle of a general representation of the device according to the present invention for setting the wheel size of the bicycle 1, 2 on a bicycle computer 3.

The bicycle computer 3 has two input media 4, 5 for two wheel sizes of either the bicycle 1 or the bicycle 2. A transmission medium 6, 7 for transmitting the wheel size of the bicycle 1, 2 is assigned to each bicycle 1, 2. The transmission medium 6 works together exclusively with the input medium 4, which is indicated by the arrow A. The transmission medium 7 works together exclusively with the input medium 5 of the bicycle computer 3, which is illustrated by the arrow B. Each input medium 4, 5 stands for one wheel size of the particular bicycle 1, 2. The value of the two wheel sizes is stored in the bicycle computer 3.

Figure 2A:
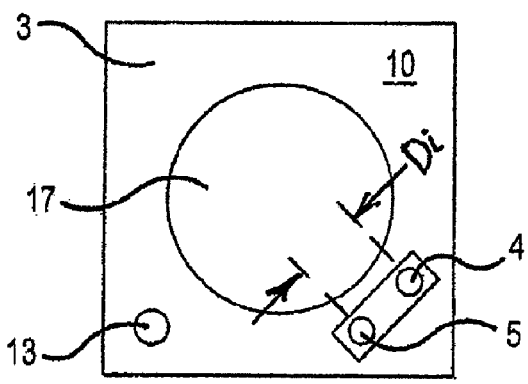
Figures 2B, 2C:
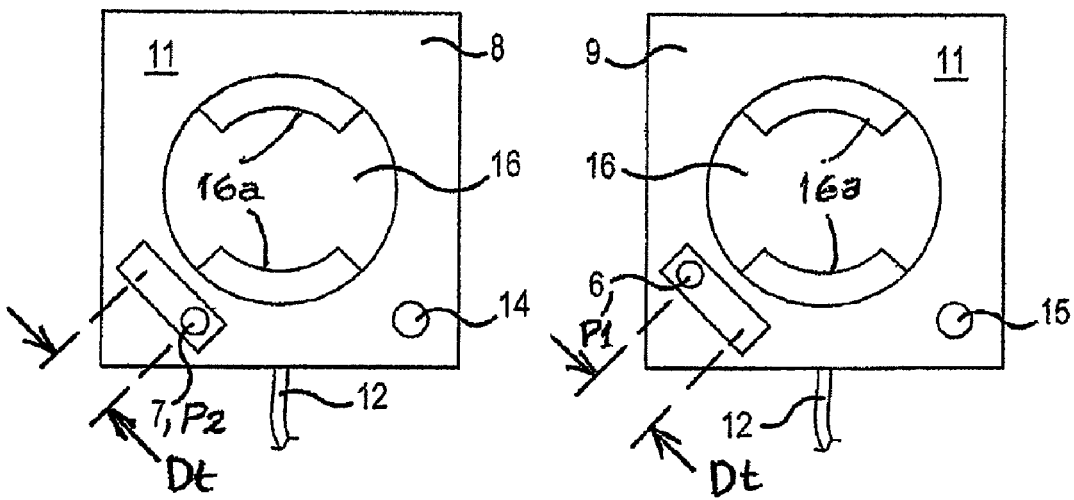

It may be seen from FIG. 2(a) that the input media 4, 5 of bicycle computer 3 are implemented in the form of electrically conductive contacts according to the exemplary embodiment described here and are spaced apart from one another. FIGS. 2(b) and 2(c) show that transmission media 6, 7 are components corresponding, respectively, to receptacle components 9 and 8. Transmission media 6 and 7 are also provided as electrically conductive contacts. The bicycle computer 3 may be accommodated in either receptacle component 9 or 8. Transmission medium 6 makes direct electrical contact with input medium 4 when computer 3 is in receptacle component 9, and transmission medium 7 makes direct electrical contact with input medium 5 when computer 3 is in receptacle component 8.

The input media 4, 5 of the bicycle computer 3 are situated on its bottom side 10. The transmission media 6, 7 of the receptacle component 8, 9 are situated on its top side 11.

Bicycle computer 3 may be used with bicycle 1 by mounting receptacle 9 onto bicycle 1 and situating the bicycle computer 3 on receptacle 9. Likewise, bicycle computer 3 (or a similar bicycle computer) may be used with bicycle 2 by mounting receptacle 8 onto bicycle 2 and situating the bicycle computer 3 on receptacle 8. When the bicycle computer 3 is situated either of receptacle component 8 or 9, the bottom side 10 of the bicycle computer 3 rests on the top side 11 of the receptacle component 8 or 9. When the bicycle computer 3 is situated on receptacle component 9 on bicycle 1, input medium 4 of the bicycle computer 3 is positioned directly above and makes direct contact with, and works together electrically with, transmission medium 6 of receptacle component 9. In a similar manner, when the bicycle computer 3 is situated on receptacle component 8 on bicycle 2, input medium 5 of the bicycle computer 3 is positioned directly above and makes direct contact with, and works together electrically with, transmission medium 7 of receptacle component 8. As a result, the wheel size of bicycle 1 is settable on the bicycle computer 3 corresponding to a preset P1 transmitted by the transmission medium 6. Likewise, the wheel size of bicycle 2 is automatically settable on the bicycle computer 3 corresponding to a preset P2 transmitted by the transmission medium 7. It will be noted that transmission medium 6 is the only transmission medium provided on receptacle component 9, and transmission medium 7 is the only transmission medium on receptacle component 8. Therefore, when the bicycle computer 3 is mounted onto receptacle component 9, there is no electrical contact between input medium 5 and transmission medium 6, and thus the input medium 5 is unable to receive the signal which sets the bicycle computer 3 to the wheel size of the first bicycle 1. Likewise, when bicycle computer 3 is mounted onto receptacle component 8, there is no electrical contact between input medium 4 and transmission medium 7. Therefore, the input medium 4 is unable to receive the signal which sets the bicycle computer 3 to the wheel size of the second bicycle 2.

It may be seen from the comparison of the two receptacle components 8 and 9 that the transmission medium 6 of the first receptacle component 9 of the first bicycle 1 is situated at a distance Dt thereto in comparison to the transmission medium 7 of the second receptacle component 8 of the second bicycle 2. The distance Dt between a position of the transmission medium 6 of the first receptacle component 9 and a position of the transmission medium 7 of the second receptacle component 8 corresponds to the distance Di between the two input media 4, 5 on the bicycle computer 3. As mentioned above, when the bicycle computer 3 is situated on receptacle component 9 on bicycle 1, input medium 4 of the bicycle computer 3 is positioned directly above and makes direct contact with transmission medium 6 of receptacle component 9. In a similar manner, when the bicycle computer 3 is situated on receptacle component 8 on bicycle 1, input medium 5 of the bicycle computer 3 is positioned directly above and makes direct contact with transmission medium 7 of receptacle component 8.

Receptacle component 9 having transmission medium 6 may be mounted on bicycle 1, and receptacle component 8 having transmission medium 7 may be mounted on bicycle 2. A reed switch, which converts magnetic pulses of a magnetic pulse generator is attached to the wheel spokes of the wheel of the bicycle 1 or 2. Electrical signals originating at the reed switch on bicycle 1 reach the transmission medium 6 on receptacle component 9 via a cable 12 which extends between receptacle component 9 and the reed switch on bicycle 1. Likewise, electrical signals originating at the reed switch on bicycle 2 reach the transmission medium 7 on receptacle component 8 via another cable 12 which extends between receptacle component 8 and the reed switch on bicycle 2. When the electrical signals originating at the reed switch on each bicycle reach the corresponding one of transmission medium 6 or 7, the signals actuate the corresponding one of input medium 4 or 5, which results in the setting of the correct wheel size in the bicycle computer 3. The pulses are also transmitted simultaneously.

A power supply is necessary for the ability of the device according to the present invention to function. This is performed by a power delivery contact 13 of the bicycle computer 3 and a power receiving contact 14, 15 of the particular receptacle component 8, 9. Congruency of the contacts 13, 14 or 13, 15 is also produced here when the bicycle computer is accommodated in the receptacle component 8, 9.

The receptacle component 8, 9 has a recess 16 with a pair of connectors 16a for accommodating a projecting engagement medium 17 of the bicycle computer 3. A detachable connection may be implemented between the pair of connectors 16a of the recess 16 of the receptacle component 8, 9 and the engagement medium 17 of the bicycle computer 3 projecting from the bottom side 10. The recess 16 has provisions (not described in greater detail) for implementing the connection. Corresponding connectors are also provided on the engagement medium 17.

The input media 4, 5 are situated outside the area of the projecting engagement part 17. The recess 16 of the receptacle component 8, 9 is enclosed by an edge area (not described in greater detail), which contains the transmission media 6, 7. A display is provided on the top side of the bicycle computer 3 diametrically opposite to the bottom side 10.

Reference is made to the general part of the description in regard to further features not shown in the figures.

Finally, it is to be noted that the teaching according to the present invention is not restricted to the exemplary embodiment explained above.

LIST OF REFERENCE NUMERALS 1 bicycle
2 bicycle
3 bicycle computer
4 input medium
5 input medium
6 transmission medium
7 transmission medium
8 receptacle component
9 receptacle component
10 bottom side 3
11 top side of 8, 9
12 cable
13 power delivery contact
14 power receiving contact
15 power receiving contact
16 recess
17 engagement medium
A arrow
B arrow

The invention claimed is:

1. A device for setting a wheel size of a first bicycle and a second bicycle, comprising:
a bicycle computer having at least a first input medium and a second input medium for receiving signals corresponding to at least two wheel sizes,
a first receptacle component assigned to the first bicycle and having a first transmission medium on a side thereof for transmitting a first signal corresponding to the wheel size of the first bicycle,
wherein the bicycle computer is capable of being directly mounted onto the first receptacle component and to be being separated from the first receptacle component, and
wherein when the bicycle computer is mounted onto the first receptacle component,
the first input medium of the bicycle computer is positioned directly above the first transmission medium of the first receptacle component, and
the first signal is an electric signal or a radio signal corresponding to the wheel size of the first bicycle, which is transmitted by the transmission medium and is received by the first input medium, sets the bicycle computer to the wheel size of the first bicycle,
the device further comprising:
a second receptacle component assigned to the second bicycle, the second receptacle component having a second transmission medium,
wherein a position of the first transmission medium of the first receptacle component is offset relative to a position of the second transmission medium of the second receptacle component by a distance (Dt) corresponding to a distance (Di) between the first and second input media on the bicycle computer, and
wherein the first transmission medium is the only transmission medium provided on the first receptacle component, and
the second transmission medium is the only transmission medium on the second receptacle component, and
the first transmission medium of the first receptacle component of the first bicycle is situated at a distance in comparison to the second transmission medium of the second receptacle component of the second bicycle, so that when the bicycle computer is mounted onto the first receptacle component, there is no communication between the second input medium and the first transmission medium, and only the first input medium is able to receive the first signal which sets the bicycle computer to the wheel size of the first bicycle, and when the bicycle computer is mounted onto the second receptacle component, there is no communication between the first input medium and the second transmission medium, and only the second input medium is able to receive a second signal which sets the bicycle computer to the wheel size of the second bicycle.

2. The device according to claim 1, wherein the first transmission medium is a component of the first receptacle component for the bicycle computer and is provided in the form of an electrically conductive contact.

3. The device according to claim 1, wherein the first transmission medium of the first receptacle component and the first input medium of the bicycle computer are positioned congruently and work together electrically while the bicycle computer is situated on the first receptacle component, so that the wheel size is settable on the bicycle computer corresponding to a target by the first transmission medium.

4. The device according to claim 1, wherein the first and second input media of the bicycle computer are situated on a bottom side of the bicycle computer, and the first transmission medium of the first receptacle component is situated on a top side of the first receptacle component, the device further comprising a second receptacle component for the second bicycle, the second receptacle having a second transmission medium situated on a top side thereof.

5. The device according to claim 1, wherein the first transmission medium is provided as a radio transmitter and transmits the radio signal corresponding to the wheel size of the first bicycle to the first input medium, the first input medium being a receiver of the radio signal from the first transmission medium.

6. The device according to claim 1, wherein each of the first and second receptacle components has a recess for accommodating the bicycle computer.

7. The device according to claim 6, wherein the bicycle computer has an engagement part projecting from a bottom side thereof, the bicycle computer being directly mountable to the first receptacle component by connecting the engagement part of the bicycle computer to the recess of the first receptacle component, and the bicycle computer being directly mountable to the second receptacle component by connecting the engagement part of the bicycle computer to the recess of the second receptacle component.

8. The device according to claim 7, wherein the first and second input media are situated on a bottom side of the bicycle computer, outside an area of the projecting engagement part.

9. The device according to claim 6, wherein the recess of each of the receptacle components is surrounded by an edge area, on which the first and second transmission media are respectively provided.

10. The device according to claim 1, wherein the first receptacle component comprises a data processing apparatus with a memory, which contains at least a criterion of the wheel size.

11. The data transfer device according to claim 6, wherein each of the first and second receptacle components has a power receiving contact, which works together with a power delivery contact of the bicycle computer when the bicycle computer is mounted onto either of the first and second receptacle components.

12. The device according to claim 3, wherein the first and second input media of the bicycle computer are situated on a bottom side of the computer, and the first transmission medium of the first receptacle component is situated on a top side of the first receptacle component.

13. A device for setting a wheel size of a first bicycle and a wheel size of a second bicycle, comprising:

a single bicycle computer;

a first input medium and a second input medium provided on the single bicycle computer, the first input medium for receiving a first signal corresponding to the wheel size of the first bicycle, and the second input medium for receiving a second signal corresponding to the wheel size of the second bicycle, the first and second input media being spaced apart from each other on one surface of the single bicycle computer, a first receptacle component having a first transmission medium for transmitting the first signal corresponding to the wheel size of the first bicycle, the first receptacle component being assigned to the first bicycle, a second receptacle component having a second transmission medium for transmitting the second signal corresponding to the wheel size of the second bicycle, the second receptacle component being assigned to the second bicycle, wherein the single bicycle computer is capable of being directly mounted onto and being separated from each of the first and receptacle components, and wherein when the single bicycle computer is mounted onto the first receptacle component, the first input medium of the single bicycle computer is positioned directly above and makes direct electrical contact with the first transmission medium, thereby enabling the first transmission medium to transmits the first signal corresponding to the wheel size of the first bicycle to the first input medium, which sets the single bicycle computer to the wheel size of the first bicycle, and when the single bicycle computer is mounted onto the second receptacle component, the second input medium of the single bicycle computer is positioned directly above and makes direct electrical contact with the second transmission medium, thereby enabling the second transmission medium to transmit the second signal corresponding to the wheel size of the second bicycle to the second input medium, which sets the single bicycle computer to the wheel size of the second bicycle, wherein the first transmission medium is the only transmission medium provided on the first receptacle component, and the second transmission medium is the only transmission medium on the second receptacle component, and the first transmission medium of the first receptacle component of the first bicycle is situated at a distance in comparison to the second transmission medium of the second receptacle component of the second bicycle, so that when the single bicycle computer is mounted onto the first receptacle component, there is no communication between the second input medium and the first transmission medium, and only the first input medium is able to receive the first signal which sets the single bicycle computer to the wheel size of the first bicycle, and when the single bicycle computer is mounted onto the second receptacle component, there is no communication between the first input medium and the second transmission medium, and only the second input medium is able to receive the second signal which sets the single bicycle computer to the wheel size of the second bicycle.

\* \* \* \* \*